United States Patent [19]
Shirai et al.

[11] Patent Number: 5,019,767
[45] Date of Patent: May 28, 1991

[54] PORTABLE POWER SUPPLY

[75] Inventors: Ichiro Shirai, Kyoto; Kazuhiko Sakuragi, Fukuoka, both of Japan

[73] Assignee: Nintendo Co., Ltd., Kyoto, Japan

[21] Appl. No.: 479,149

[22] Filed: Feb. 12, 1990

[30] Foreign Application Priority Data

Feb. 16, 1989 [JP] Japan .................. 1-17744[U]
Feb. 16, 1989 [JP] Japan .................. 1-17745[U]

[51] Int. Cl.⁵ .................. H01M 10/46; A45F 5/00
[52] U.S. Cl. .................. 320/2; 224/902; 307/150
[58] Field of Search .................. 320/2; 307/150; 224/902

[56] References Cited

U.S. PATENT DOCUMENTS

| | | | |
|---|---|---|---|
| 3,919,615 | 11/1975 | Niecke | 320/2 |
| 4,382,220 | 5/1983 | Marshall et al. | 320/2 |
| 4,748,344 | 5/1988 | Sing | 320/2 X |
| 4,845,650 | 7/1989 | Meade et al. | 307/150 X |

FOREIGN PATENT DOCUMENTS 56-61973  5/1981 Japan .
56-166664 12/1981 Japan .
57-161768 10/1982 Japan .
60-855 1/1985 Japan .

*Primary Examiner*—R. J. Hickey
*Attorney, Agent, or Firm*—Nixon & Vanderhye

[57] ABSTRACT

A portable power supply has a body case, an attaching portion, an input portion, a voltage lowering portion, a storage battery, an output portion and heat radiating means. The body case has two opposing major surfaces and two sections divided by a prescribed reference line. The attaching portion is provided on one of the major surfaces for detachably attaching the power supply to a human body. The input portion and the output portion are positioned in one of the sections to be exposed from the body case. The input portion is connected to a commercial power source, and the output portion is connected to a prescribed electronic device. The voltage lowering portion lowers power from the input portion. The storage battery is charged by the output from the voltage lowering portion. The heating radiating means is provided on the other one of the major surfaces of the body case and makes the heat radiation of the other one of the major surfaces higher than that of the one of the major surfaces. Center of gravity of the portable power supply is positioned in the other one of the two sections.

20 Claims, 8 Drawing Sheets

PORTABLE POWER SUPPLY

BACKGROUND OF THE INVENTION

1. Field of the Invention

The present invention relates to a portable power supply and, more specifically, to a portable power supply to be connected to electronic devices such as a handy game machine (commercially available by the name of "GAME BOY") employing dot matrix liquid crystal display screen.

2. Description of the Background Art

Generally, a power supply for supplying power to various electric devices and electronic devices such as electric tools, video cameras and so on has a box-shaped body case containing batteries.

For example, Japanese Utility Model Laying Open No. 60-855 discloses a portable battery case. In this battery case, charging is done with the case body containing storage batteries attached to a charger, and after the charging is completed, it is detached from the charger, and a holder body having a hook is engaged so that power can be supplied to an electronic device while it is carried. Sometimes, such battery case is used incorporated in or attached to the body of the electronic device to which the power is supplied. A storage battery is charged by connecting the same to a charger provided separately from the battery case, as shown in Japanese Utility Model Laying Open No. 56-61973 and in Japanese Utility Model Laying Open No. 56-166664, for example.

Japanese Utility Model Laying Open No. 57-161768 discloses a packed power supply which is capable of both supplying power to electronic devices and of being charged from a commercial power source. The packed power supply contains a storage battery and a step-down transformer for supplying charging power to the storage battery. In charging, plugs are exposed to be inserted into receptacles, and after charging, the packed power supply is used incorporated in the body of the electronic device. Therefore, the packed power supply cannot supply power to an electronic device or the like while it is being charged. In addition, since power supply to an electronic device is done when the power supply is incorporated in or attached to the device, a space for accommodating the packed power supply must be provided in the electronic device, which prevents reduction in size of the electronic device.

In view of the foregoing, U.S. Pat. No. 3,919,615 discloses a power belt for carrying a portable power supply adapted to supply power to an electronic device while repeatedly charging the storage battery. The portable power supply comprises an input terminal which is connected to a commercial power source, an output terminal which is connected to an electronic device such as a video camera, the storage battery to be charged, and a charger, and the storage battery and the charger are electrically connected to each other through an external connecting cord. Therefore, the use of the portable power supply with the power supply attached to a human body is not very safe, since electric contact and the like between the storage battery and the connecting code are exposed.

In an inverter unit 80 of the above described power belt, a voltage lowering portion such as a step-down transformer or a transistor inverter is provided for supplying charging power to the storage battery by lowering the voltage of the commercial power source. It may be possible to attach the inverter unit to a human body while the power supply is connected to a commercial power source to charge the storage battery, enabling use of the electronic device. However, if the charging or power supply to the electronic device is carried out with the body case attached to one's body, the voltage lowering portion is considerably heated by the operation. Therefore, the user may feel uncomfortable or anxious, since his body (waist) touching the rear surface of the body case is heated by the heat radiation therefrom. The heat caused by the voltage lowering portion becomes more and more conspicuous as the volume of the body case becomes smaller and smaller, when a transistor inverter is used for the voltage lowering portion in order to minimize the portable power supply.

A portable power supply as described above comprises an input portion connected to a commercial power source, and an output portion for supplying power of a storage battery to an electronic device or the like. Such a power supply is often used and treated while it is carried. Accordingly, when the power supply happens to fall on the floor, for example, the input portion or the output portion provided outside the body case may be damaged or deformed by the shock at the time of falling. This may cause troubles in connecting the power supply to the commercial power source or to electronic devices.

SUMMARY OF THE INVENTION

One object of the present invention is to provide a portable power supply having superior safety capable of simultaneously supplying power and of being charged.

Another object of the present invention is to provide a portable power supply capable of preventing influence of heat generated by voltage lowering portion on human body.

A further object of the present invention is to provide a portable power supply in which an input portion and an output portion can be effectively protected from a shock when it falls.

A portable power supply in accordance with one aspect of the present invention comprises a body case, an attaching portion, an input portion, a voltage lowering portion, a storage battery and an output portion. The attaching portion is for attaching the body case detachably to a human body. The input portion is provided exposed from the body case and it is connected to a commercial power source through a connecting cord. The voltage lowering portion is contained in the body case, and it lowers voltage of the power supplied from the input portion. The storage battery is contained in the body case and is charged by the output from the voltage lowering portion. The output portion is provided exposed from the body case, and it can be connected to a prescribed electronic device through a connecting cord, for supplying power charged in the storage battery.

In the portable power supply in accordance with one aspect of the present invention, the storage battery is contained in the power supply, so that the electric contact portions for charging and for power supply are not externally exposed. Therefore, safety in charging and power supply can be improved. In addition, power can be supplied to an external electric device connected to the output portion with the storage battery being charged contained in the power supply. Therefore, power supply to the electronic device can be carried out simultaneously with the charging of the storage battery. In addition, the portable power supply is not used incorporated in or attached to the electronic device. Power is supplied to the electronic device through a connecting cord, while the power supply is carried separately from the electronic device. Therefore, it is convenient for supplying power to a small and compact electronic device.

A portable power supply in accordance with another aspect of the present invention comprises a body case, an attaching portion, an input portion, a voltage lowering portion, a storage battery, an output portion and heat radiating means. The body case has two opposing wall surfaces. The attaching portion is provided on one of the wall surfaces of the body case for detachably attaching the body case to a human body. The heat radiating means is to improve heat radiation of one of the wall surfaces of the body case to be higher than that of the other one of the wall surfaces.

In the portable power supply in accordance with this another aspect of the present invention, the voltage lowering portion is heated as it operates, when power is supplied to an electronic device while charging the storage battery, with the power supply carried by the attaching portion attached to a belt at one's waist, for example. However, the heat radiation of the wall surface of the body case opposite to the attaching portion is provided is improved by the heat radiating means. Accordingly, heat from the voltage lowering portion is substantially radiated to outside from the wall surface of the body case opposite to the human body, and the heat radiation from the side in contact with the human body can be reduced. Therefore, the user is free from discomfort or anxiety caused by the transmission of heat from the voltage lowering portion to his body.

A portable power supply in accordance with a further aspect of the present invention comprises a body case, an attaching portion, an input portion, a voltage lowering portion, a storage battery and an output portion. The body case has two sections divided by a prescribed reference line. The input portion is positioned on one of the wall surfaces of the body case (for example, lower portion when the case is attached to the human body by the attaching portion). The output portion is positioned on the other one of the wall surfaces of the body case (for example, the upper portion when the case is attached to the human body by the attaching portion). The input and the output portions are provided in one of the two sections (e.g. the left side). The voltage lowering portion, which is heavy as it includes a transformer and the like, is contained in the other of the two sections (e.g. the right side). Therefore, the center of gravity of the portable power supply is positioned in the other section, which is opposite to the section where the input and output portions are formed.

In the power supply in accordance with this further aspect of the present invention, when the body case happens to fall on the floor or the like while it is carried, the body case falls inclined to the side of the other area at which the center of gravity exist. Consequently, an end portion opposite to the area at which input portion and the output portion are positioned hits the floor or the like at first. Consequently, the shock at falling is not directly applied to the input portion or to the output portion. Therefore, damage to the input portion or the output portion can be prevented, reducing possibility of short circuit or the like caused by the damage.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
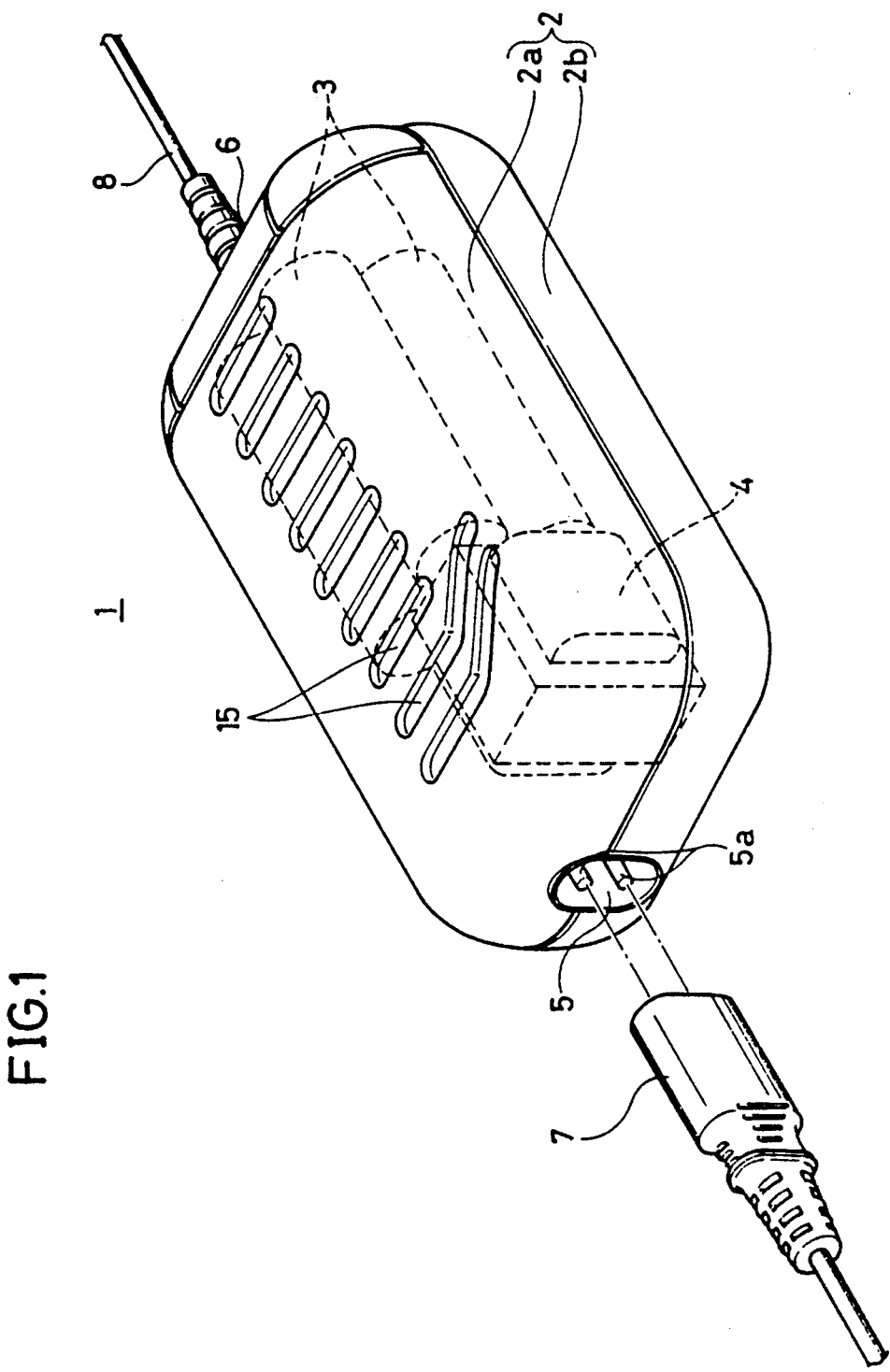
FIG. 1 is a perspective view showing one embodiment of the portable power supply in accordance with the present invention.

An embodiment of the portable power supply in accordance with the present invention will be described in the following with reference to FIGS. 1 to 4. The portable power supply 1 comprises a body case 2. The body case 2 is a box-shaped case consisted of two halves 2a and 2b joined together. Chargeable batteries such as nickel cadmium (hereinafter referred to as storage batteries) 3 and a voltage lowering portion 4 consisted of a transformer or a transistor inverter are contained in the body case 2. More specifically, four storage batteries 3, for instance, are contained along the center line N.A on one side in the longitudinal direction of the body case 2 (e.g. upper side when the case is attached to the human body by the attaching portion 13), and the voltage lowering portion 4 is contained on the right side of the center line on the other (lower) side. An input portion 5 connected to a commercial power source is provided to be exposed on a prescribed surface, for example, lower end surface of the body case 2. An output portion 6 for supplying power charged in the storage batteries 3 to a prescribed electronic device (not shown) is provided to be exposed on the upper end surface of the body case 2. A terminal pin 5a for coupling a plug 7 connected to an AC power supply through a connecting cord is provided at the input portion 5. The plug portion 8a is connected to the output portion 6 through the connecting cord 8.

Especially in this embodiment, the input portion 5 is provided on the left side of the center line N.A on lower end surface of the body case 2. The output portion 6 is provided on the left side of the center line N.A on the upper end surface of the body case 2. The relatively heavy voltage lowering portion 4 is contained biased to the right side of the center line N.A in the lower portion of the body case 2. A phantom line P connecting the input portion 5 and the output portion 6 is positioned on the left side of the center line N.A. Therefore, the center of gravity G of the body case 2 is biased the right side of the center line N.A. The center of gravity is further moved to the right when the body case is suspended by the cord 8.

The body case 2 further contains a circuit board 10 including a charging circuit and the like. The body case is sealed by coupling the halves 2a and 2b by a coupling bolt 9.

Figure 3:
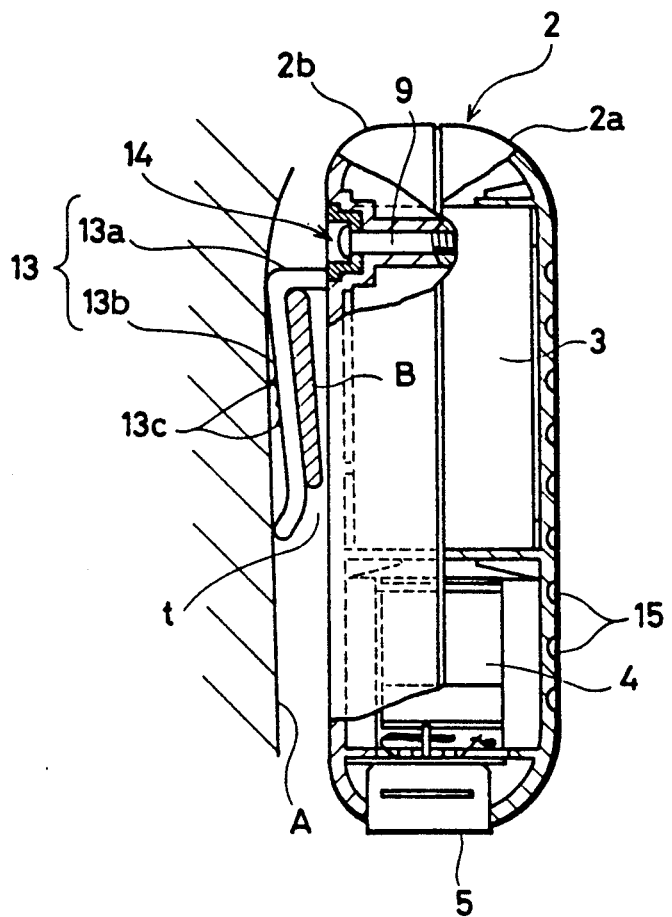
FIG. 3 is a side view showing, in partial explosion, one embodiment of the portable power supply in accordance with the present invention.
Figure 4:
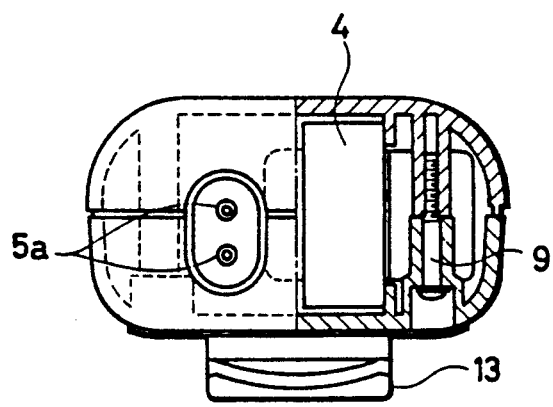
FIG. 4 is a bottom view showing, in partial explosion, one embodiment of the portable power supply in accordance with the present invention.

Referring to FIG. 3, a hook shaped attaching portion 13 is provided on the rear surface of the body case 2. The hook shaped attaching portion 13 has a base end portion 13a provided projecting from the body case 2 and an engaging portion 13b bent toward the side of the body with only the tip end portion thereof bent outward from the body. The base end portion 13a is mounted on a mounting portion 14 by the coupling bolt 9. The mounting portion 14 is a concave portion provided on the other end portion of the body case 2. Ribs 13c for preventing slip are provided on the surface of the attaching portion 13b. The attaching portion 13 is formed of a flexible material such as synthetic resin or metal thin plate. There is a space t between the engaging portion 13b and the rear surface of the body case 2. Namely, the attaching portion 13b is flexible to be bent to the side of the body case 2, with the base end portion 13a being the center. The attaching portion 13 is detachably attached to, for example, a waist A of a human body with the attaching portion 13 gripping a belt B.

A plurality of concave grooves 15 are provided laterally on the surface of the body case 2 which corresponds to the position of the storage batteries 3 and of the voltage lowering portion 4. The concave grooves 15 are provided for effectively radiating heat caused by the operation of the voltage lowering portion 4 to the outside opposite to the waist A. By the provision of these concave grooves 15, the thickness of the wall portion of the half 2a on the surface side of the body case 2 can be made thin, and the heat radiating area can be enlarged. Therefore, the heat radiating function of the surface side of the body case 2 is significantly improved. For example, when the wall portion of the body case 2 is formed of synthetic resin, the heat conductivity is inversely proportional to the thickness of the wall portion. Namely, the heat conductivity is doubled when the thickness of the wall portion is reduced to one half. In addition, by providing grooves having concave or arc cross section, the surface area of the wall portion is enlarged. The heat radiating effect of the surface of the body case 2 can be further improved accordingly.

When the cross section of the groove is an arc, decrease of mechanical strength of the wall portion can be suppressed, compared with grooves having rectangular cross section, even when the thickness of the wall portion is reduced.

Figure 5:
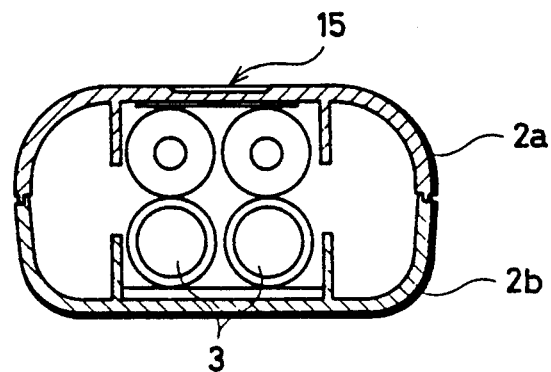
FIG. 5 is cross sectional view taken along the line V—V of FIG. 2.
Figure 6:
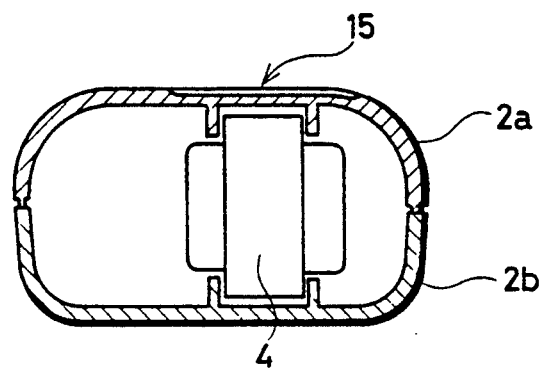
FIG. 6 is a cross sectional view taken along the line VI—VI of FIG. 2.

As shown in FIGS. 5 and 6, the storage battery 3 and the voltage lowering portion 4 are arranged in contact with the inner surface of the surface side of the half 2a. Therefore, decrease of strength of the half 2a caused by the formation of the concave groove 15 is compensated for by the battery 3 and the voltage lowering portion 4, and at the same time, heat conductivity from the voltage lowering portion 4 to the half 2a is improved.

Figure 7:
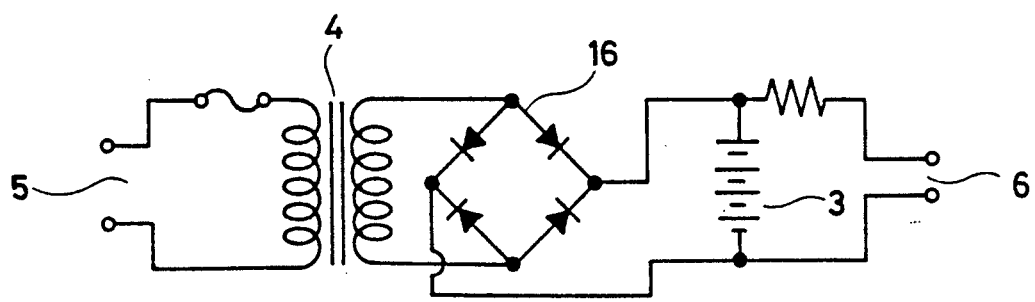
FIG. 7 is an electric circuit diagram of the portable power supply in accordance with the present invention.

Referring to FIG. 7, the input portion 5 is connected to a primary side of the voltage lowering portion 4 formed of a transformer or the like. The positive and negative output ends of a plurality of storage batteries 3 are connected to a secondary side of the voltage lowering portion 4 through a rectifier 16. Charging and power supply to electronic device can be simultaneously carried out by supplying power to the output portion 6 while the batteries are charged by the output from the voltage lowering portion 4, in this manner. Further, the portable power supply can be used as an AC adapter by connecting the input portion 5 to an AC power source and by connecting an electronic device to the output portion 6.

Figure 8:
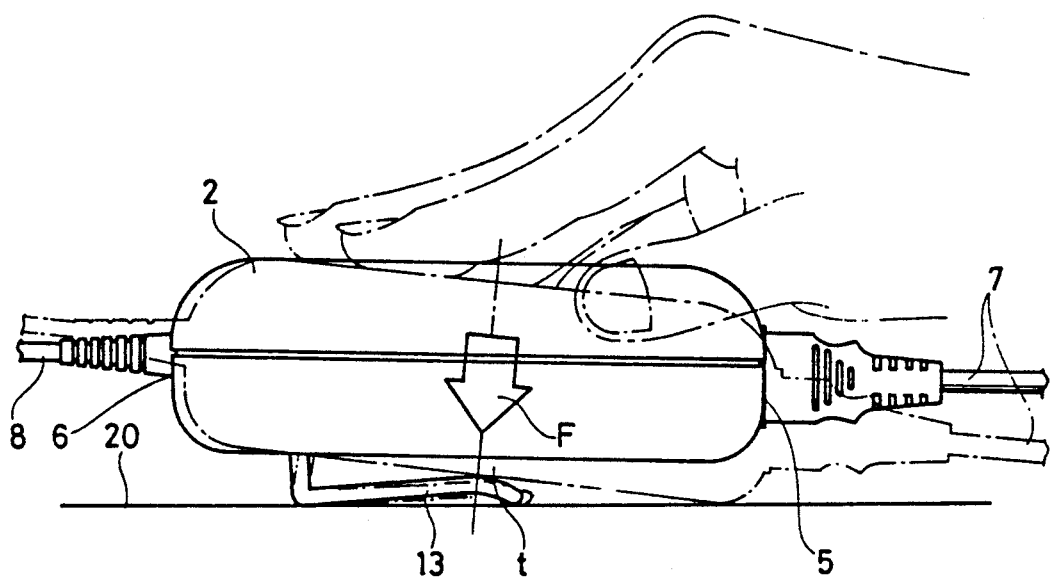
FIG. 8 shows the portable power supply of the present invention placed on the floor.

When this power supply 1 is to be used as a backup power supply, the power supply 1 is attached to one's body A by engaging the attaching portion 13 with a belt B. An electronic device is connected to the output portion 6 via the plug portion 8a, whereby power is supplied to the electronic device. When the output of the storage battery 3 is reduced to be lower than a prescribed level as the batteries are discharged, the storage batteries 3 are charged by connecting the plug 7 to the input portion 5 and connecting a cord on the power source side to a commercial power source. In that case, as shown in FIG. 8, the power supply 1 may be detached from the human body and placed on the floor 20 or desk for charging. Now, when the body case 2 is placed on the floor with the attaching portion 13 facing downward and the user happens to step on the body case 2, an external force F directed downward is applied from above the surface. At that time, the attaching portion 13 is bent inward. However, since there is a space t, the external force F is absorbed by the elastic deformation of the attaching portion 13, and therefore, the power supply 1 is not damaged. Even when an excessive external force F is applied and the space t cannot be ensured, the large external force F can be absorbed or released by deformation of the bent portion formed on the tip end of the attaching portion 13. In that case, the connecting cord 7 of the body case is held lift upward from the floor. Therefore, deformation of the input portion 5 by the application of external force to the connecting cord can be prevented.

Let us consider a case in which the power supply 1 is attached to a human body A for supplying power to an electronic device and for charging storage batteries 3 simultaneously. In that case, larger charging current flows in the voltage lowering portion 4, compared with mere charging. Therefore, the voltage lowering portion 4 is further heated. However, since concave grooves 15 are formed on the surface of the body case 2, the heat is emitted exclusively from the surface side having better heat radiation. Accordingly, heat is hardly transmitted to the human body through the rear surface of the body case 2. Discomfort caused by the heat transmitted to the body can be prevented.

When the power supply 1 is attached to a human body, the storage batteries 3 are contained in the upper space of the body case 2, and the voltage lowering portion 4 is contained in the lower space of the body case 2, so that a space is surely provided between the waist A and the lower portion of the body case 2 where the voltage lowering portion 4 is contained. By appropriately selecting such positional relation, the heat from the voltage lowering portion 4 is hardly transmitted to the waist A. In addition, since the storage batteries 3 are heavier than the voltage lowering portion 4, the lower portion of the body case 2 where the voltage lowering portion 4 is positioned does not come closer to the waist A. Accordingly, the body case 2 can be attached stably to the waist A of the human body by the attaching portion 13.

Figure 9A:
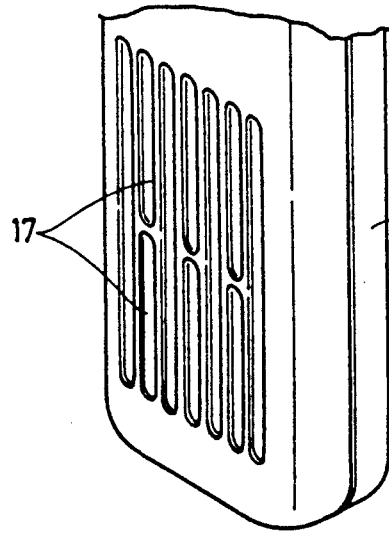
FIGS. 9A and 9B are partial perspective views showing another embodiment of heat radiating means in the portable power supply of the present invention.
Figure 9B:
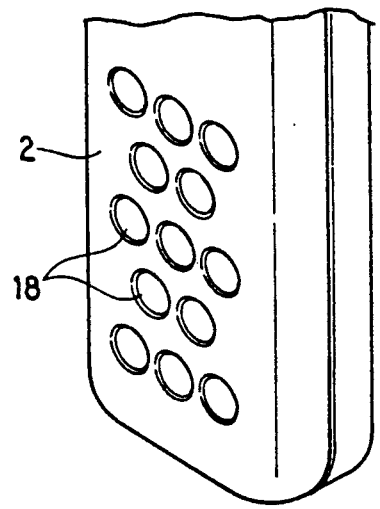

Various methods other than the above described embodiment may be used for improving heat radiation of the surface side of the body case 2. For example, the concave grooves 17 may be formed vertically as shown in FIG. 9A. By doing so, the heat tends to escape upward along the direction of the concave grooves. A plurality of spots 18 may be provided as shown in FIG. 9B. The thickness D1 of the wall surface on the rear side of the body case 2 may be made thicker and the thickness D2 of the wall surface of the surface side may be made thin. Alternatively, a heat radiating plate or material 19 having high heat conductivity may be provided on the wall surface portion of the body case 2 facing the voltage lowering portion 4. The heat radiating plate 19 is formed by mixing powder materials having high heat conductivity such as aluminum, copper, zinc or the like in a synthetic resin.

Figure 11:
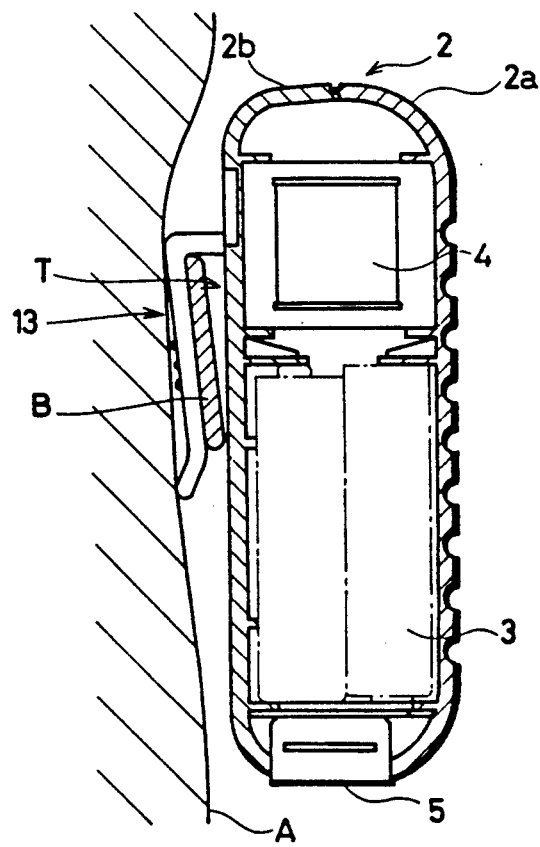
FIG. 11 is a cross sectional view showing another embodiment of the portable power supply of the present invention.

FIG. 11 is a cross sectional view showing another embodiment of the present invention. In this embodiment, positions of the storage batteries 3 and the voltage lowering portion 4 are selected to be inverted in the up and down directions. The attaching portion 13 is provided on the wall surface of the rear surface of the body case 2 facing the voltage lowering portion 4. At this time, a space T is surely provided between the waist A and the body case 2, as the attaching portion 13 engaged with the belt B serves as a spacer. Therefore, even if the heat from the voltage lowering portion 4 is transmitted to the rear surface of the body case 2, the heat is emitted from the space T to the side, and the heat is hardly transmitted to the waist A. The storage batteries 3 heavier than the voltage lowering portion 4 are positioned on the lower portion of the body case 2. Therefore, even if the lower portion of the body case 2 where the storage batteries 3 are contained comes near to the waist A, the heat radiating path from the voltage lowering portion 4 is not obstructed, and heat is not transmitted to the waist A.

Figure 2:
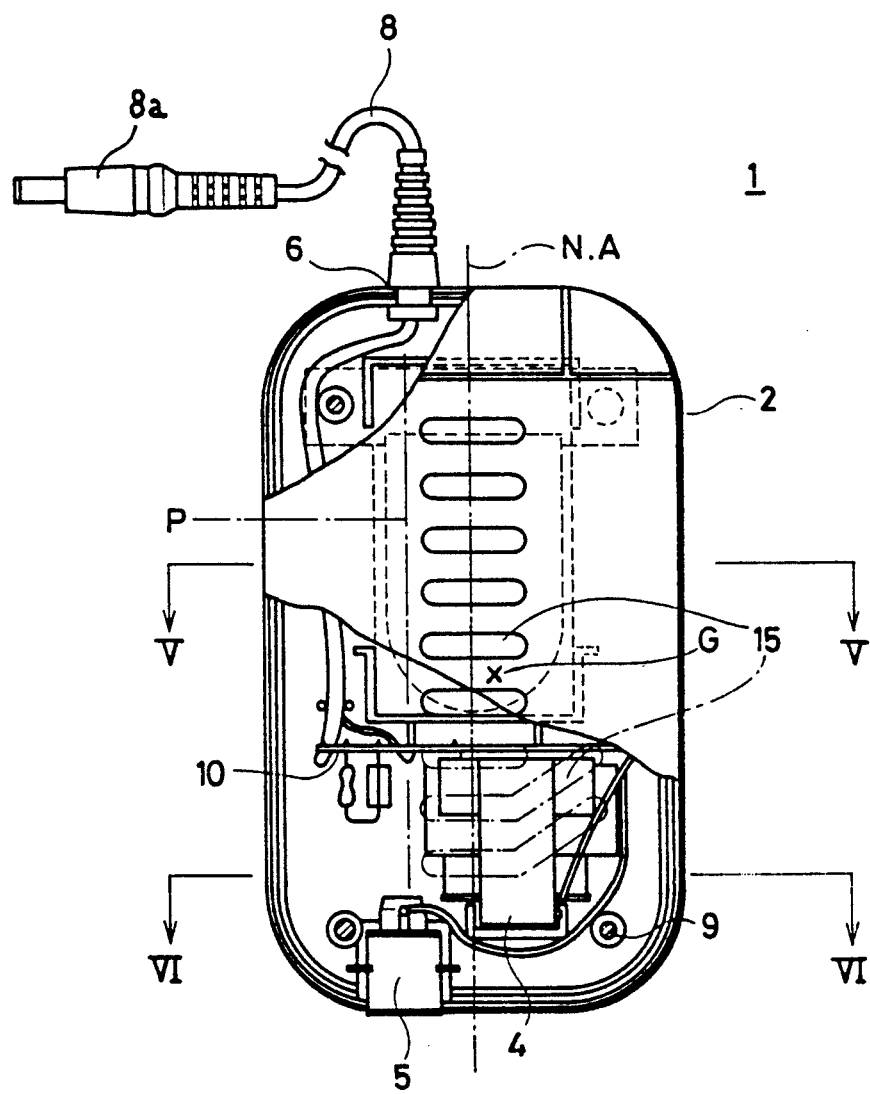
FIG. 2 is a front view showing, in partial explosion, one embodiment of the portable power supply in accordance with the present invention.
Figure 10:
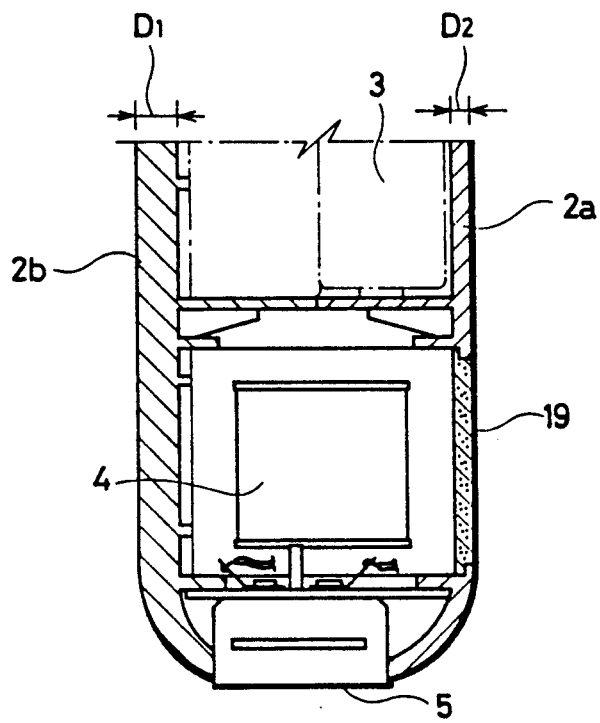
FIG. 10 is a partial cross sectional view showing a further embodiment of the heat radiating means in the portable power supply of the present invention.
Figure 12:
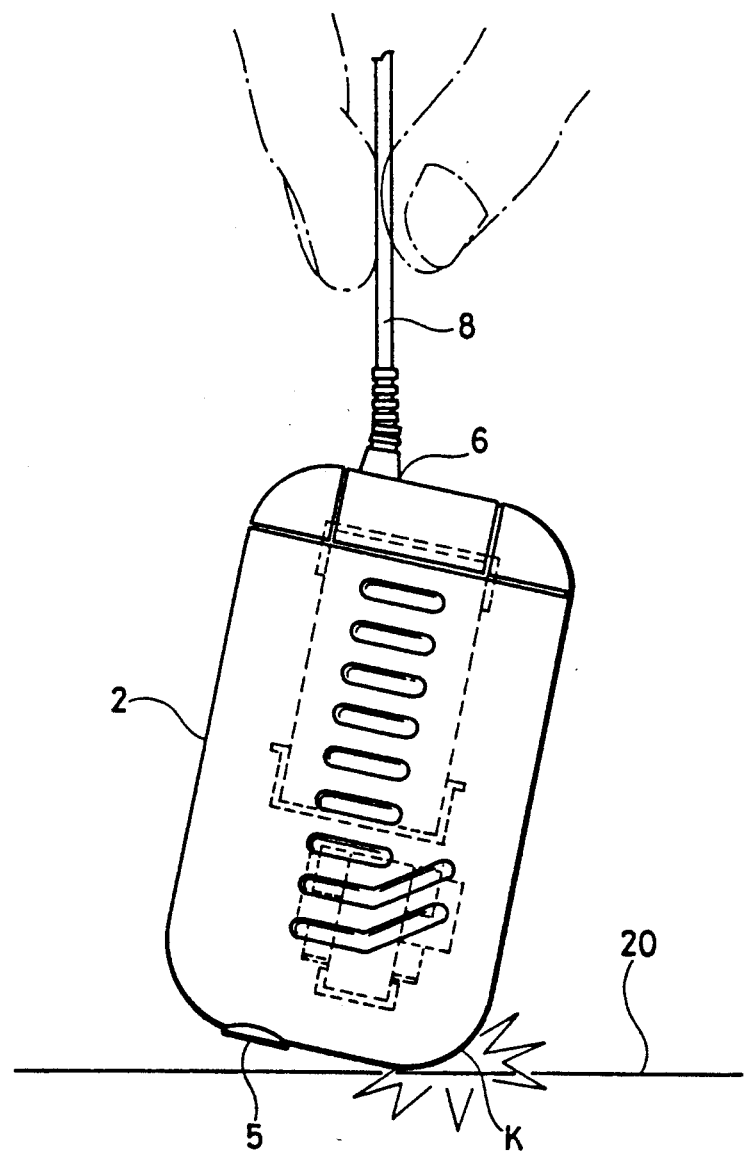
FIG. 12 is a front view showing the portable power supply of the present invention when it falls.

The portable power supply 1 may happen to fall when the attaching portion 13 is engaged with or detached from the belt B or when it is carried. However, the positional relation between respective portion is set such that the center of gravity G of the power supply 1 is positioned on the right side (i.e. opposite to the position of formation of the output portion 5) of the center line N.A, as shown in FIG. 2. Therefore, if the power supply 1 falls, the body case 2 falls inclined to the side of the center of gravity G, as shown in FIG. 12. Accordingly, an end portion K opposite to the input portion 5 first hits the floor 20. Namely, the input portion 5 provided on an end portion opposite to the end portion K can be prevented from first hitting the floor, whereby the damage to the input portion 5 can be prevented. Even when the power supply 1 falls with the output portion 6 facing downward, the output portion 6 can be protected from the shock of falling from the same reason. The input portion may be formed of a charging plug blade retractable from the side surface of the body case 2.

When power supply is supplied to an electronic device including a high frequency clock source such as s microprocessor by using an external portable power supply through a connecting cord 8, other electronic devices may possibly be affected by unnecessary radiation generated at portions such as a connecting portion between the electronic device and the tip end plug portion 8a of the connecting cord 8 and from the connecting cord 8 itself.

In order to prevent this problem, noise preventing means may be provided at the connecting portion on the side of the electronic device. However, when the electronic device is operated by using the built-in power supply, the noise preventing means is unnecessary. In addition, provision of such a noise preventing means increases cost of the electronic device. Further, the provision of the noise preventing means increases the size of the electronic device, making it inconvenient to carry the electronic device.

Figure 13:
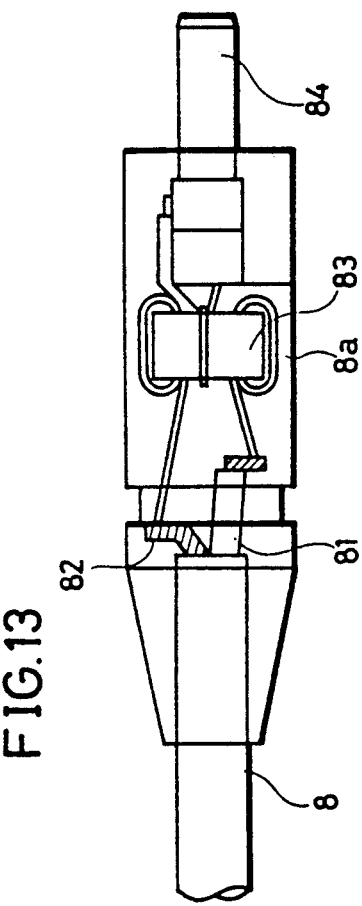
FIG. 13 is a schematic diagram showing one embodiment of noise preventing means provided on a cord connected to the output portion of the portable power supply of the present invention.

In view of the foregoing, in another preferred embodiment of the power supply of the present invention an output plug portion 8a such as shown in FIG. 13 is employed. Noise preventing means is provided at the plug portion 8a. The connecting cord 8 is shielded. Tip ends of a core 81 and a shield 82 are wound four times over positions symmetrical to each other by the angle of 180° of the ferrite core 83, respectively, and are connected to pin portions 84 and 85 of the plug portion 8a. The ferrite core 83 is a ring formed of Ni-Zn material. The plug portion 8a processed in this manner is covered by insert molding, using vinyl chloride resin.

Figure 14:
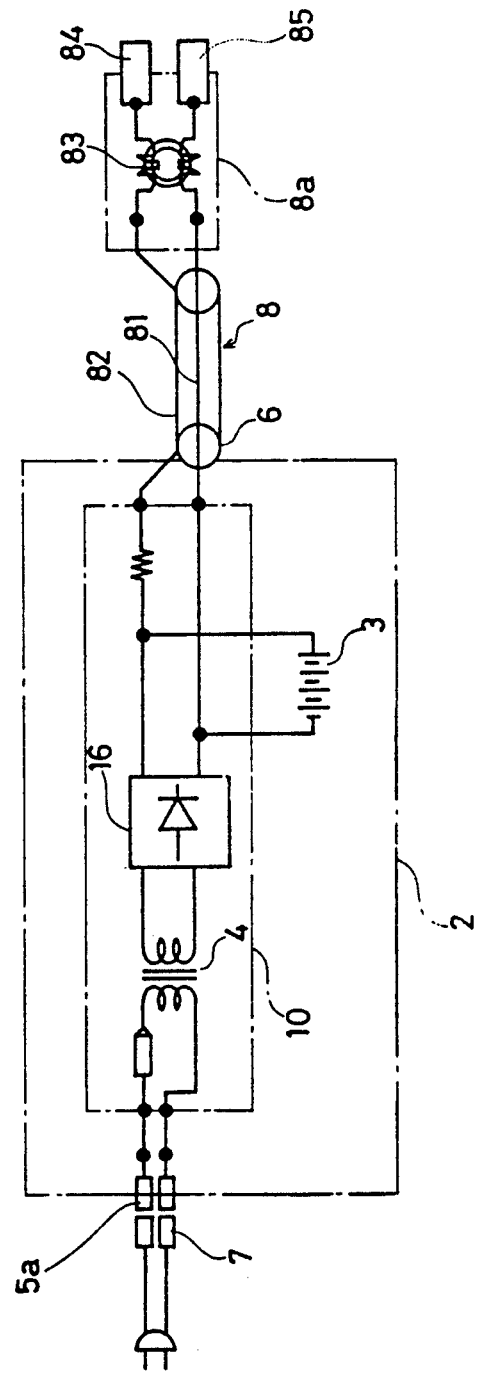
FIG. 14 is an electric circuit diagram showing the portable power supply when the noise preventing means of FIG. 13 is provided.

FIG. 14 is an equivalent circuit diagram with the plug portion 8a formed as shown in FIG. 13. In FIG. 14, the impedance on the side of the pin portions 84 and 85 should preferably be no less than 200 Ω, when a signal of 30 MHz is applied. By incorporating the noise preventing means in the plug portion 8a in this manner, the electronic device can be made compact and handy. Even if the radiation frequency of the electronic device is different, only the plug portion 8a has to be changed to correspond thereto.

When the ferrite core 83 is arranged in a direction orthogonal to the direction of attachment/detachment of the plug portion 8a, the ferrite core 83 also serves as a reinforcement of the structure of the plug portion 8a. Accordingly, even when the plug portion 8a is coated and insert molded by a soft synthetic resin, it well withstands the force gripping the plug 8a when it is attached/detached. Accordingly, breaking between the core 81, the shield 82 and the pin portions 84 and 85 can be reduced, since unnecessary deformation is prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable power supply, comprising:

a body case;

an attaching portion for detachably attaching said body case to an article of clothing worn on a human body;

an input portion provided exposed from said body case and capable of being connected to a commercial power source through a connecting cord;

a voltage lowering portion contained in said body case for lowering the voltage of power supplied from said input portion;

a storage battery contained in said body case, charged by an output from said voltage lowering portion;

an output portion provided exposed from said body case and capable of being connected to a prescribed electronic device through a connecting cord for supplying power charged in said storage battery to the device; and a cord connected to said output portion, said cord including a tip end portion having a plug portion with noise preventing means.

2. A portably power supply according to claim 1, wherein said body case has a first end and an opposing second end, said input portion being positioned at said first end and said output portion being positioned at said second end of said body case.

3. A portable power supply according to claim 2, wherein said voltage lowering portion is positioned in the vicinity of said first end of said body case, and said storage battery is positioned in the vicinity of said second end of said body case.

4. A portable power supply according to claim 3, wherein said body case includes two major opposing surfaces, said attaching portion is provided on one of said major surfaces of said body case such that said first end is positioned at a lower position relative to said second end, when said body case is attached to a human body.

5. A portable power supply according to claim 1, wherein said body case comprises two opposing major surfaces, said attaching portion provided on one of said major surfaces.

6. A portable power supply according to claim 5, wherein said attaching portion has a base portion provided projecting from one of said major surfaces, and an engaging portion provided continuous from the base portion bent to have a prescribed angle with the base portion.

7. A portable power supply according to claim 6, wherein said engaging portion is spaced apart by a prescribed distance from one of said major surfaces, and said attaching portion is formed of a flexible material.

8. A portable power supply comprising:

a body case having two opposing major surfaces;

an attaching portion provided on one of said major surfaces; of said body case for detachably attaching said body case to an article of clothing worn on a human body;

an input portion provided exposed from said body case to be connected to a commercial power source;

a voltage lowering portion contained in said body case for lowering voltage of power supplied from said input portion;

a storage battery contained in said body case charged by an output from said voltage lower portion;

an output portion provided exposed from said body case connected for supplying power charged in said storage battery to a prescribed electronic device; and heat radiating means formed on the other one of said major surfaces for making higher heat radiation of the other one of said major surfaces than said one of said major surfaces of said body case.

9. A portable power supply according to claim 8, wherein said heat radiating means comprises a concave portion formed on the other one of said major surfaces.

10. A portable power supply according to claim 9, wherein said concave portion is a plurality of grooves having concave cross section.

11. A portable power supply according to claim 10, wherein cross section of said groove having concave cross section is an arc cross section.

12. A portable power supply according to claim 10, wherein said plurality of grooves comprise grooves approximately parallel to each other.

13. A portable power supply according to claim 12, wherein said groove comprises a groove extending upward and downward, when said body case is attached to a human body.

14. A portable power supply according to claim 9, wherein said storage battery and said voltage lowering portion are arranged in contact with the other one of said major surfaces in said body case.

15. A portable power supply accordingly to claim 14, wherein the other one of said major surfaces with which at least said voltage lowering portion is in contact is formed of a material having high heat conductivity.

16. A portable supply according to claim 8, wherein, the other one of said major surfaces has a portion thinner than said one of said major surfaces.

17. A portable power supply, comprising:

a body case having a first section and a second section divided by a prescribed reference line;

an attaching portion for detachably attaching said body case to an article of clothing worn on a human body;

an input portion positioned in one of said sections of said body case, provided exposed from said body case to be connected to a commercial power source;

a voltage lowering portion, contained at a position biased with respect to said prescribed reference line towards said second section, for lowering the voltage of power supplied from said input portion;

a storage battery contained in said body case to be charged by an output from said voltage lowering portion; and an output portion positioned in one of said sections of said body case, provided exposed from said body case connected to supply power charged in said storage battery to a prescribed electronic device; wherein the center of gravity of said portable power supply is positioned in said second section.

18. A portable power supply according to claim 17, wherein said body case has a first end and a second end, and said input portion is positioned at said first end of said body case in a direction of extension of said reference line, and said output portion is positioned at said second end of said body case.

19. A portable power supply according to claim 18, wherein said input portion and said output portion are arranged such that a line connecting said input portion and said output portion is approximately parallel to said reference line.

20. A portable power supply, comprising:

a body case having two opposing major surfaces and a first section and a second section divided by a prescribed reference line;

an attaching portion provided on one of said major surfaces of said body case for detachably attaching said body case to an article of clothing worn on a human body;

an input portion positioned in one of said sections of said body case, provided exposed from said body case to be connected to a commercial power source;

a voltage lowering portion, contained at a position biased with respect to said prescribed reference line towards said second section, for lowering the voltage of power supplied from said input portion;

a storage battery contained in said body case charged by an output from said voltage lowering portion;

an output portion positioned in one of said sections of said body case, provided exposed from said body case connected for supplying power charged in said storage battery to a prescribed electronic device; and heat radiating means formed on the other one of said major surfaces for making higher heat radiation of the other one of said major surface than said one of said major surfaces of said body case; wherein the center of gravity of said portable power supply is positioned in said second section.

* * * * *